(12) United States Patent
Hartnack et al.

(10) Patent No.: US 7,862,955 B2
(45) Date of Patent: Jan. 4, 2011

(54) ELECTROLYTIC CELL OR FUEL CELL WITH PRESSURE PADS AND IMPROVED TRANSFER RESISTANCE

(75) Inventors: Herbert Hartnack, Erlangen (DE); Josef Lersch, Heroldsbach (DE); Arno Mattejat, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1091 days.

(21) Appl. No.: 10/558,170

(22) PCT Filed: Apr. 15, 2004

(86) PCT No.: PCT/DE2004/000785
§ 371 (c)(1),
(2), (4) Date: Nov. 9, 2006

(87) PCT Pub. No.: WO2004/109838
PCT Pub. Date: Dec. 16, 2004

(65) Prior Publication Data
US 2007/0051631 A1    Mar. 8, 2007

(30) Foreign Application Priority Data
May 26, 2003   (DE) ................. 103 23 883

(51) Int. Cl.
*H01M 8/04* (2006.01)
*H01M 2/14* (2006.01)
(52) U.S. Cl. ............. 429/512; 429/508; 429/513; 429/514

(58) Field of Classification Search ........... 429/512, 429/513, 514
See application file for complete search history.

(56) References Cited

U.S. PATENT DOCUMENTS

| 4,317,864 A | | 3/1982 | Strasser |
| 5,472,801 A | * | 12/1995 | Mattejat et al. ............... 429/39 |
| 5,736,269 A | | 4/1998 | Okamoto et al. |
| 5,824,199 A | | 10/1998 | Simmons et al. |
| 6,468,682 B1 | | 10/2002 | Fuglevand et al. |
| 2005/0191538 A1 | * | 9/2005 | Diez ........................... 429/38 |

FOREIGN PATENT DOCUMENTS

| DE | 100 03 528 A1 | 8/2001 |
| EP | 0 308 761 A1 | 3/1989 |
| EP | 0 591 800 A1 | 4/1994 |
| JP | 61239568 A | 10/1986 |
| JP | 05062702 A | 3/1993 |

* cited by examiner

*Primary Examiner*—Patrick Ryan
*Assistant Examiner*—Muhammad Siddiquee

(57) ABSTRACT

The invention relates to an electrochemical battery, in particular a fuel cell battery or electrolytic cell battery comprising several electrolytic electrode units, a number of cooling cards for respectively cooling at least one of the electrolytic electrode units and at least one pressure chamber, which can be impinged by a pressure independently of the media supply of the electrolytic electrode units, for creating a contact pressure between components of the electrochemical battery that adjoin the pressure chamber. The pressure chamber adjoins at least one of the cooling cards and is at least partly delimited by said cooling cards.

25 Claims, 4 Drawing Sheets

ELECTROLYTIC CELL OR FUEL CELL WITH PRESSURE PADS AND IMPROVED TRANSFER RESISTANCE

CROSS REFERENCE TO RELATED APPLICATIONS

This application is the U.S. National Stage of International Application No. PCT/EP2004/000785, filed Apr. 15, 2004 and claims the benefit thereof. The International Application claims the benefits of German application No. 10323883.2, filed May 26, 2003, both applications are incorporated by reference herein in their entirety.

FIELD OF INVENTION

The invention relates to an electrochemical battery, especially a fuel cell battery or electrolytic cell battery comprising several electrolytic electrode units, a number of cooling cards for respectively cooling at least one the electrolytic electrode units and at least one pressure chamber which can be impinged by a pressure independently of the media supply of the electrolytic electrode units for creating a contact pressure between components of the electrochemical battery that adjoin the pressure chamber. This type of electrochemical battery is for example known from EP 0 591 800 B1.

BACKGROUND OF INVENTION

EP 0 591 800 B1 discloses a fuel cell battery, which features in each case two interconnected plates arranged in parallel to each other and forming an intermediate cavity between two electrolytic electrode units arranged in parallel to each other and each consisting of an anode, a Polymer Electrolyte Membrane (PEM) and a cathode. Between the plates and the electrodes of the two adjacent electrolytic electrode units are embodied gas or fluid spaces for introducing operating media such as hydrogen or oxygen to the electrolytic electrode units.

One way in which the cavity between the two plates arranged in parallel to each other can be used is to feed in or to extract the cooling medium. In this case the two plates form a cooling card for cooling the two electrolytic electrode units. Instead of being used for inserting and removing the cooling medium, the cavity can also be used as a pressurized chamber for setting up a pressure pad which exerts pressure on the adjacent components and thereby creates a contact pressure between these adjacent components, to guarantee a good current flow between these two components for example. On the other hand such a pressure pad can be used as an element for compensate for tolerances in the dimensions of the adjacent components. However, when the cooling card is used as a pressure pad the cooling of the fuel cell block is reduced.

A battery known from DE 27 29 640 C3 consisting of a number of electrochemical cells, especially fuel elements, features electrolytic electrode units arranged in parallel to each other, between which contact elements are arranged for tapping off power. These contact elements feature a cavity for feeding in a pressurized medium and are thus embodied as pressure pads for pressing together the overall arrangement. This enables an even contact pressure to be created between adjacent components and thereby for example the current flow between these components improved. No cooling of the electrolytic electrode units is provided here.

Cooling cards are additionally generally known, from WO 02/50953A2 for example. A cooling card disclosed in this application is embodied as a composite printed circuit board with two plates which form a cavity between them. This cavity features inlet and outlet channels and has cooling water or also heating water flowing through it during the operation of the fuel cells.

SUMMARY OF THE INVENTION

The object of the invention is to develop an electrochemical battery of the type mentioned at the start that combines a simple and compact structure stands and outstandingly good cooling of the electrolytic electrode units and good contact pressure between adjoining components.

In accordance with the invention this object is achieved by the claims. Advantageous embodiments of the invention are the object of the dependent claims.

An electrochemical battery in this case is taken to mean a fuel cell battery as well as a battery comprising electrolytic cells.

In accordance with the invention the at least one pressure chamber is adjacent to at least one of the cooling cards and is at least partly delimited by this cooling card. A cooling card in this case is taken to mean any type of welded plate or plate formed in any other way which forms a cavity for a cooling medium. For example it includes double plates which lie on top of one another and are joined together along their edges to seal against each other. The cooling cards can include openings for accepting and emitting cooling media. To reduce the transfer resistance to adjacent components a cooling card can be provided additionally with a contact plate and/or contact foil on its surface.

The invention thus departs from the path previously followed of forming a pressure pad by applying pressure to the cavity of a cooling card. Instead a cooling card is used for forming a pressure chamber located outside the cooling card. The cooling card can thus continue to be supplied with the cooling medium and enable electrolytic electrode units to be cooled, while a contact pressure between adjacent parts can be created by the pressure area. The use of cooling cards to construct the pressure chamber makes the battery stand out by virtue of its small number of different parts and also a simple and compact construction.

If the cooling card is directly adjacent to an electrolytic electrode unit and is in contact with this unit electrically, it serves to draw current from this electrolytic electrode unit as well as to cool it. As well as the current collector element which contacts the electrolytic electrode unit, in this case the cooling card, making flat contact with the unit, the transfer resistance between the electrolytic electrode unit and the current collector element is also of significance. As a rule the transfer resistance drops as the contact pressure increases. Unless even contact pressure is exerted on the surface of the electrolytic electrode unit, cross currents occur from areas with high transfer resistance to areas with low transfer resistance. These types of cross currents flowing through poorly conducting materials such as carbon paper, catalyzer layers, carbon-plastic composites or poorly conducting sheet metal causes a voltage drop and thereby loss of efficiency. With the aid of the pressure chamber an even pressure can now be applied to the entire cooling card, an even contact pressure created between the cooling card and the electrolytic electrode unit and cross currents on the surface of the electrolytic electrode unit avoided.

In accordance with an advantageous embodiment of the invention the pressure chamber is arranged between two of the cooling cards and at least partly delimited by these two cooling cards. With a stack arrangement of alternating electrolytic electrode units and cooling plates in the electrochemical battery the pressure chamber can thus be obtained in a simple manner by removing an electrolytic electrode unit from the stack arrangement between two cooling cards and using the empty space thus produced as a pressure chamber.

In accordance with a further advantageous embodiment of the invention the pressure chamber is arranged between one of the cooling cards and a pole plate and at least partly delimited by the cooling card and the pole plate. A pole plate in this case is taken to mean a plate which terminates a cell stack which is used for collecting current. Here too components already present in the battery are thus used for forming the pressure chamber and a more simple construction of the battery is thereby guaranteed.

To make it possible for current to flow through the pressure chamber a current transfer part is arranged within the pressure chamber, preferably adjoining the at least one cooling card. If the medium provided for creating internal pressure in the pressure chamber differs from the media with which the electrolytic electrode unit is operated, corrosive effects on the electrically conducting elements arranged within the pressure chamber for connection of two cooling cards or for connection of a cooling card with a pole plate can in principle be excluded.

Since the distances between the borders of the pressure chamber can change when pressure is applied, the current transfer part should make it possible to compensate for these distances. This is possible by the current transfer part being embodied as a spring element.

Within a block of cells stacked to form a battery a current flows in the normal case in an overall normal manner to the individual generally plate-shaped cells. The current transferred from cell to cell should in this case flow on the shortest possible path to keep the power dissipation low. Advantageously the spring element therefore features at least one sheet with a number of spring tongues bent outwards from the plane of the sheet. Via the spring tongues the current can flow on relatively short paths from one the two cooling plates at least partly delimiting the pressure chamber or between the cooling plate and pole plate delimiting the pressure chamber.

The spring tongues preferably enclose form acute angle with an adjacent cooling card in each case and thus make it possible to compensate for the gap within a wide area in the battery by comparison with the thicknesses of the flat components of the electrolytic electrode units and also an electrical connection divided up into a plurality of individual current paths between adjacent electrolytic electrode units or between an electrolytic electrode unit and a pole plate.

Preferably the at least one cooling card features a contact plate on its side facing the pressure chamber for reducing the transfer resistance to the current transfer part.

In accordance with a preferred development the contact plate features a conductive layer applied to a base layer, with the specific electrical conductivity of the conductive layer exceeding the specific electrical conductivity of the base layer The current collected on the surface of the cooling card and passed on to a further cooling card or a pole plate is typically not drawn off over the entire surface but only at individual points or areas of the cooling card. The conductive layer on the cooling card minimizes cross currents caused by poorly conducting materials and concentrates them into the material that conducts well, namely the conducting layer, so that at most a small power dissipation occurs.

The conductive layer is preferably applied in the form of an electrical coating or a foil to the basic layer. In each case is good electrical contact between the conductive layer and the at least slightly flexible base layer is established.

The thickness of the conductive layer, especially in the case in which it is embodied as an electrically created coating, is preferably less than the thickness of the base layer, in which case, because of the higher specific conductivity of the conductive layer, its absolute electrical conductivity can be greater than the absolute electrical conductivity of the base layer. In each case the contact plate, especially in the form of a combination of base layer and conductive layer, is far more conductive than the adjoining cooling card.

Within a cell stack of a battery it is sufficient to arrange a pressure chamber or a pressure pad consisting of two cooling cards and an intermediate pressure chamber between just a part of the individual cells or electrolytic electrode units. Typically the number of the electrolytic electrode units within the battery amounts to at least double the number of pressure pads, typically being ten times this number for example. The dimensions of the battery are thus at least not significantly increased by the pressure pads.

The advantage of invention lies especially in the fact that a pressure pad is created within a cell stack of an electrochemical battery which serves both as a geometrical compensation element, and also as a cooling element. Through spring elements arranged in the corrosion-protected pressure chamber a low-loss current conductance between adjacent electrolytic electrode units or between an electrolytic electrode unit and a pole plate is possible.

An exemplary embodiment of the invention is explained in more detail below with reference to a drawing.

BRIEF DESCRIPTION OF THE DRAWINGS

Parts which correspond to each other are shown by the same reference symbols in all the Figures.

DETAILED DESCRIPTION OF INVENTION

Figure 1:
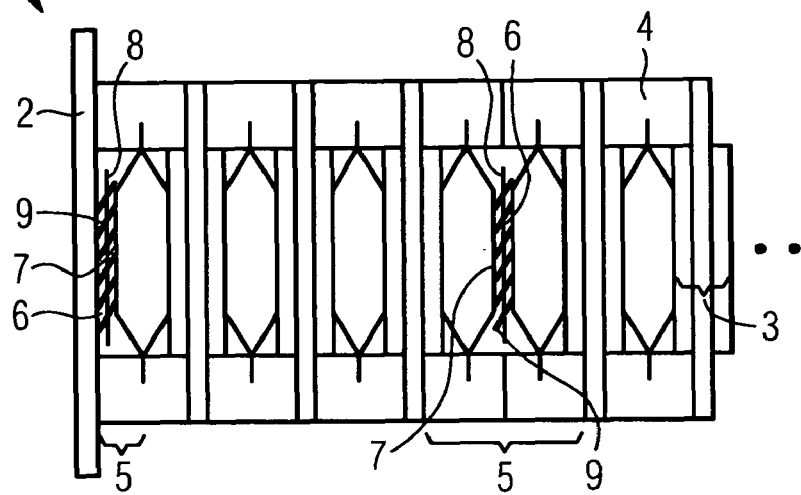
FIG. 1 shows a fuel cell block as electrochemical battery.

FIG 1 shows sections in a simplified cross sectional diagram of an electrochemical battery 1 in the form of a fuel cell battery or a fuel cell block also referred to for short as a fuel cell or fuel cell stack. The battery 1 comprises a first pole plate 2, a second pole plate not shown, arranged at a distance from the first plate and parallel to it, as well as a number of electrolytic electrode units 3 arranged between these plates. Between two of the electrolytic electrode units 3, which are also referred to as membrane-electrolytic electrode units (ME) and comprise carbon papers, catalyzer layers and membranes of the fuel cell 1, as well as between an outside electrolytic electrode unit 3 and the adjacent pole plate 2 a cooling card 4 is arranged. The cooling cards 4 also used as bipolar plates are formed from thin metal sheets which can be easily deformed because of the material strength and geometrical structure and adapt to differences in height of the adjacent components, i.e. the membrane-electrolytic electrode units 3 including gas chambers not shown in any greater detail or the pole plates 2.

in the section of the battery 1 shown in FIG. 1 one of the electrolytic electrode units 3 is removed from the stack so that a cavity is formed at this point. Applying pressure to this cavity with any given medium forms a pressure pad 5 which comprises a pressure chamber 6 and also two cooling cards 4 delimiting this chamber. The pressure in the pressure chamber 6 is greater than the pressures in the adjacent gas and cooling water chambers, so that the pressure chamber 6 is expanded and the adjoining chambers are compressed. A pressure pad 5 with just one cooling card 4, but with an otherwise similar structure, directly adjoins the pole plate 2. The boundary surface between the pressure chamber 6 and the cooling card 4 is formed by a contact plate 7 which exhibits at least a slight flexibility. The pressure of the medium in the pressure chamber 6 of the pressure pad 5 creates a surface contact to the adjacent components, especially on the electrolytic electrode units 3 also referred to as cells which does not exhibit any difference over the surface of the components even if the components, as a result of manufacturing tolerances for example, have thickness which differ locally. This produces a distribution of the transfer resistances which is homogeneous across the surface, especially between the electrolytic electrode units 3 and the cooling cards 4. Furthermore the choice of the contact pressure in the pressure chamber 6 which is independent of the result of mechanical manufacturing provides an opportunity for setting the transfer resistance low overall. The medium in the individual pressure chambers 6 is in this case different from the medium used for operation of the electrolytic electrode units 3.

The distance between the opposite contact plates 7 of the cooling cards 4 in the pressure pad 5 thus varies, this distance being a function of the tolerances of the components which are arranged between two pressure pads 5, the spring characteristics of these components, provided they can be deformed by pressure and the level of the pressure which the medium in the pressure pad 5 exerts. The cooling cards 4 collect electrical current from the electrolytic electrode units 3 over their surface.

Figure 2:
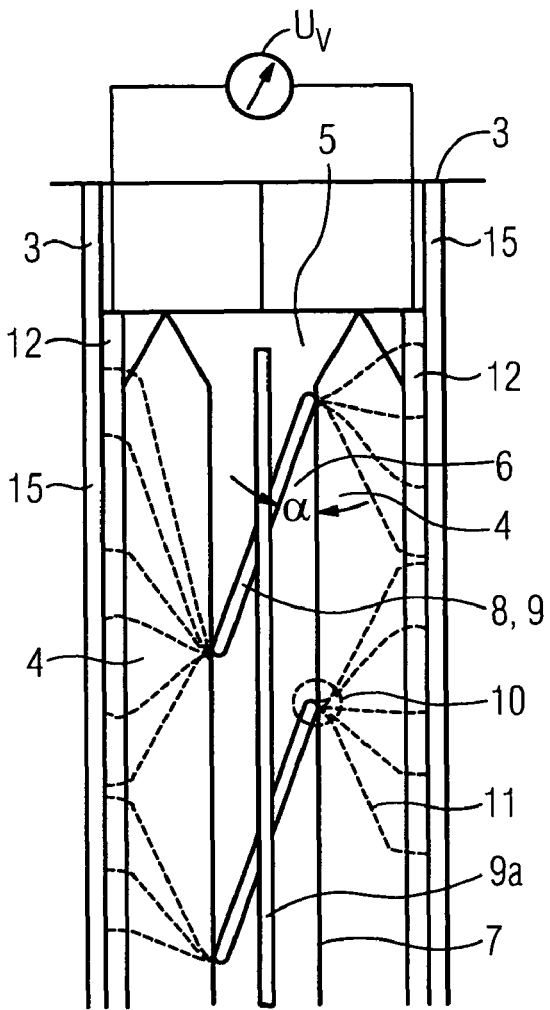
FIG. 2 shows a pressure pad of a fuel cell block with a cooling card with an uncoated contact plate.

For transfer of the current through the geometrically variable pressure chamber 6 a spring element 8 shown in more detail in FIG. 2 with reference to a first exemplary embodiment of a pressure pad 5 suitable for the battery 1 is provided as a current transfer part. This comprises a metal plate 9$a$ with a plurality of individual spring tongues 9, which make contact with the contact plate 7 and form a variable acute angle $a$ with this plate in each case. The electrical connection between the spring tongues 9 and the contact plates 7 is made at contact points 10 which are almost punctiform in cross-section. The current arising evenly in the flat electrolytic electrode units 3 is thus bundled in the contact points 10. The current flow from the electrolytic electrode units 3 through the cooling cards 4 to the contact points 10 is indicated by dashed current path lines 11. Between each electrode 12 of two opposing electrolytic electrode units 3 an overall voltage loss UV occurs which is primarily caused by poorly conducting materials such as carbon paper and the materials of the cooling card 4 such as graphite, graphite-plastic compounds, stainless steel and other metallic materials. The heat losses arising because of the voltage loss UV reduce both the efficiency and also the maximum achievable power of the fuel cell 1. The spring tongues 9 with their good conductivity only contribute to a small degree to the voltage loss UV. The voltage loss UV is further minimized by the fact that, because of the current paths 11 routed through the spring tongues 9 no conducting or at least no exclusive conducting of current over the edge of the pressure pads 5 is necessary, so that the current flows on relatively short paths between the individual electrolytic electrode units 3. Since the spring element 8 with the spring tongues 9 is arranged within the pressure chamber 6 which is not subjected to the corrosive effects of the operating media of the fuel cell 1, the electrical resistance of the components between the individual electrolytic electrode units 3 is not a function of time.

The contact plate 7 can consist entirely of a material with high electrical conductivity, such as gold for example. A more cost-effective solution is possible in accordance with FIG. 3 when the contact plate 7 only partly consists of the material with high electrical conductivity. In this case each contact plate 7 features a base layer 13 as well as a conductive layer 14 applied to the former with higher specific conductivity and also higher absolute conductivity. The conductive layer 14 can in this case be embodied in the form of an electrical coating, a foil or a flexible plate adjoining the cooling card 4 and is located exclusively on the side of the contact plate 7 facing away from the cooling card 4, provided this plate is permanently connected to the cooling card 4. Otherwise the contact plate 7 features conductive layers 14 on both sides. The form of the conductive layer 14 follows in each operating state the form of the cooling card 4, so that a planar current transfer from the cooling card 4 to the conductive layer 14 is produced. The electrical current flows from a membrane 15 of the electrolytic electrode unit 3 on a very short path primarily perpendicular to the extent of the electrolytic electrode unit 3, through the electrode 12 and the cooling card 4 to the conductive layer 14 and is only distributed there, in material which conducts well, in parallel to the electrolytic electrode unit 3, so that overall an electrical resistance is produced which is less than in the exemplary embodiment in accordance with FIG. 2. The conductive layer 14 is also adapted to the contour of the card's surface where the cooling card 4 has a structured surface in order to keep the current paths 11 short in components which conduct relatively badly. In the case of a pressure pad 5 adjoining a pole plate 2 the conductive layer 14 is also arranged on a side of the contact plate 7 bordering on the pressure chamber 6.

Figure 3:
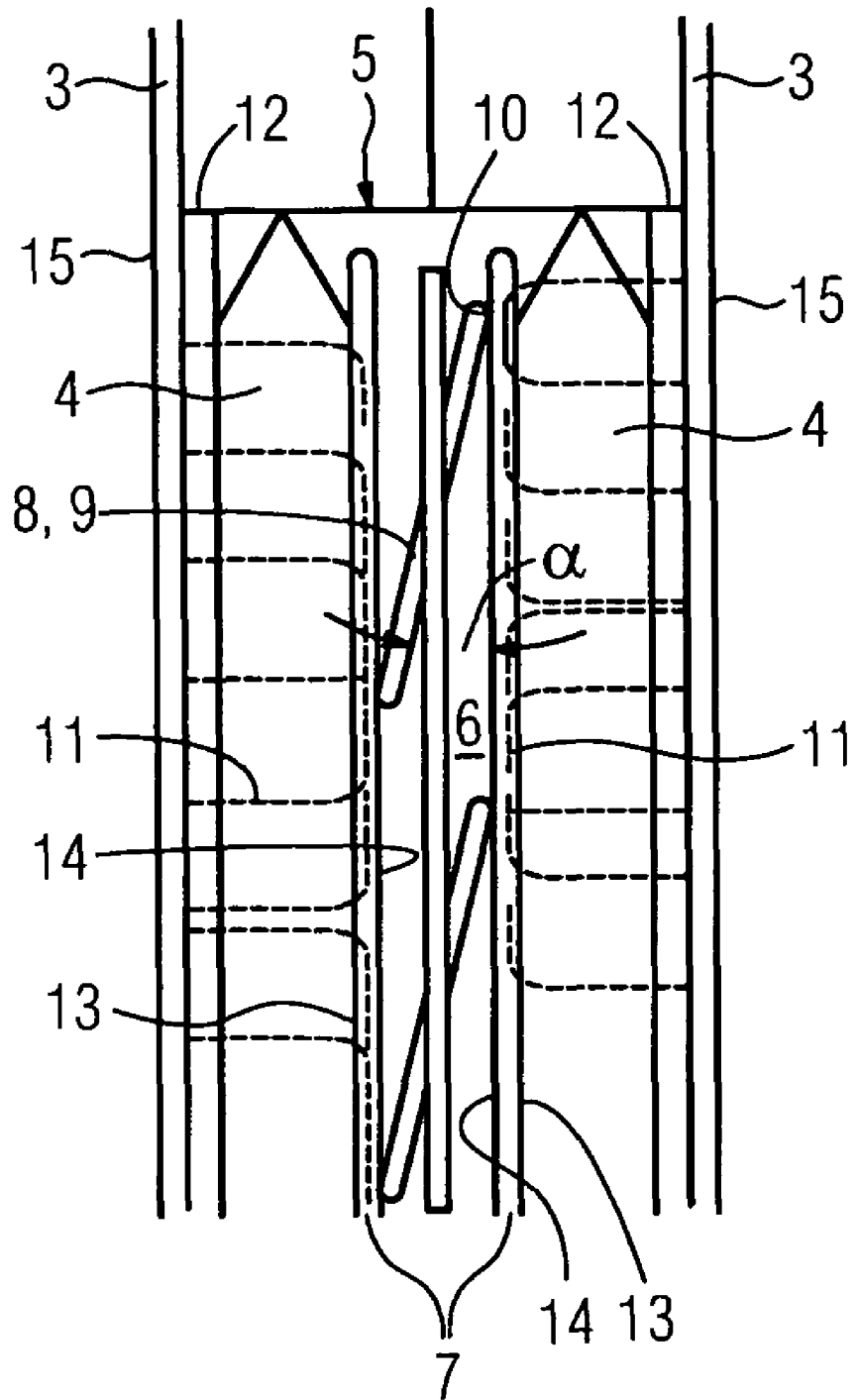
FIG. 3 shows a pressure pad with a cooling card with a coated contact plate.
Figure 4A:
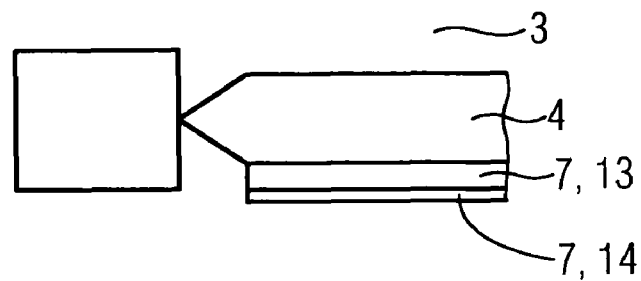
FIG. 4a-c show cross-sectional views of an exemplary embodiment of a cooling card and of a contact plate respectively.
Figure 4B:
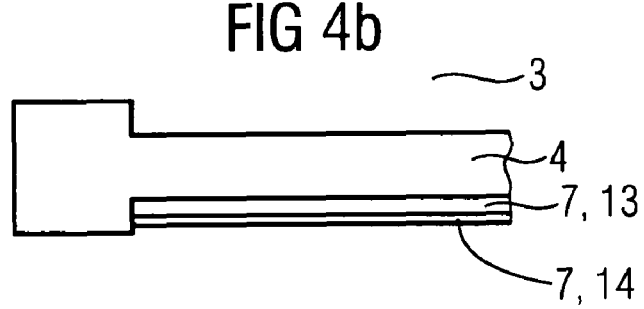
Figure 4C:
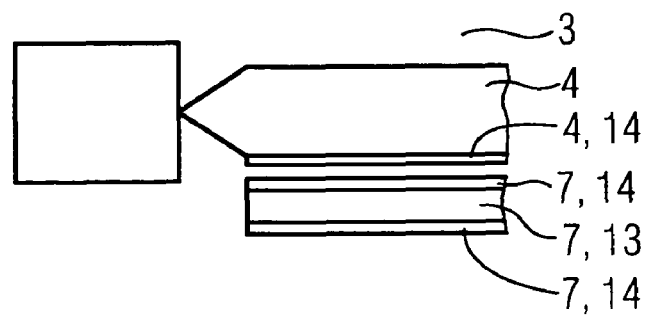

Three exemplary embodiments of cooling cards 4 and contact plates 7 interacting with them, which are each suitable for an arrangement in accordance with FIG. 3, are shown schematically in FIG. 4$a$ to 4$c$. In this case in the examples shown in FIG. 4$a$ and 4$b$ respectively the contact plate 7 is permanently connected to the cooling card 4 in each case, whereas in the exemplary embodiment in accordance with FIG. 4$c$ the contact plate 7 is provided as a separate component.

The cooling card 4 shown in FIG. 4$a$ features a basic material in the form of a metal plate to which the base layer 13 of the contact plate 7 formed from copper is applied electrically. Onto this layer the conductive layer 14 of gold is also applied either electrically or for example by sputtering, pressure welding or friction welding.

In the exemplary embodiment in accordance with FIG. 4$b$ the cooling card 4 features a carbon compound as its basic material. The base layer 13 of the contact plate 7 is permanently connected to this, for example pressed or glued on. The conductive layer 14, in a similar way to the exemplary embodiment in accordance with FIG. 4$a$, is applied as a coating. especially a coating of gold, electrically or for example by sputtering, gluing, pressure welding or friction welding to the base layer 13.

The exemplary embodiment shown in FIG. 4$c$ comprises a cooling card 4 made of sheet metal as its basic material, onto which, unlike in the exemplary embodiment in accordance with FIG. 4$a$, a conductive layer 14 in the form of a coating, especially of gold, is applied directly, electrically or for example by sputtering, gluing, pressure welding or friction welding. As a component not connected to the cooling card 4 the contact plate 7 also features on both sides conductive layers 14, preferably of gold, applied to the base layer 13 of copper. In all exemplary embodiments the spring tongues 9 are preferably covered with a gold coating which is not shown in the diagrams, so that both between the cooling card 4 and the contact plate 7 and also between this and the spring element 8 a low transfer resistance is produced.

Figure 5A:
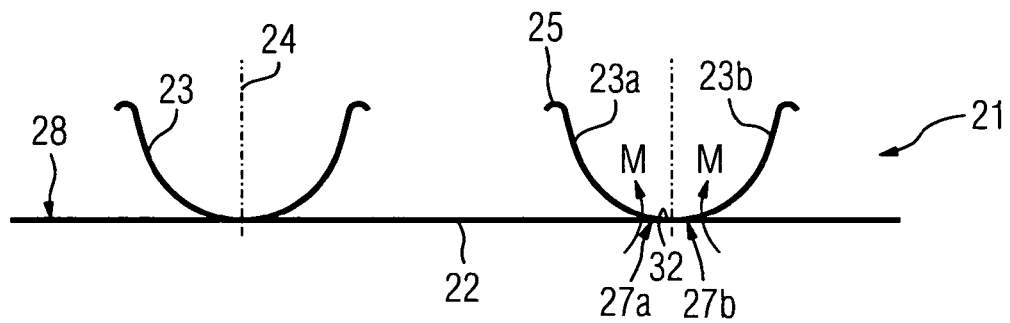
FIG. 5a-b show especially advantageous embodiments of a spring element.
Figure 5B:
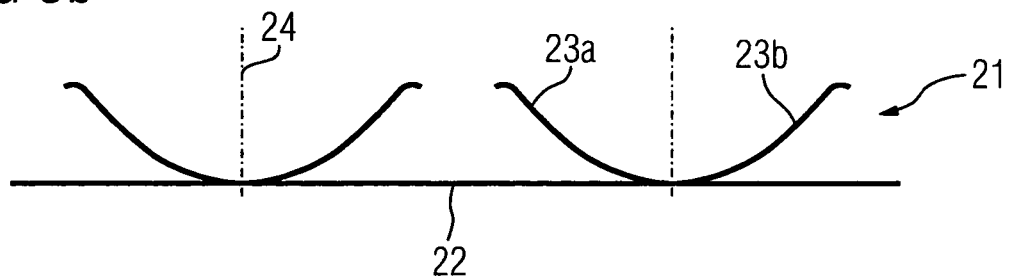

FIG. 5a and 5b show two especially advantageous embodiments of a current transfer part embodied as a spring element. The spring element is embodied as a contact spring sheet 21 and features a metal sheet 22 with spring tongues 23 protruding from the plane of the sheet 28, with two spring tongues 23a, 23b being arranged and formed in each case such that is a force is exerted on the tongue tips 25 in a direction perpendicular to the plane of the sheet 28 the bending moments M created by each of the spring tongues in the plane of the sheet 28 at least partly cancel each other out.

Through the at least part mutual cancelation of the bending moments created in the sheet plane 28 a twisting of the connecting post 32 between the two spring tongues 23a, 23b can be largely avoided and the connecting post can be kept small in this way. This enables a large number of spring tongues to be arranged in the plane of the sheet, so that a high number of contacts of the contact spring sheet and as a result short paths for as loss-free as possible current conduction through the battery are made possible. In addition smaller connecting posts lead to an improvement in the spring characteristics of the contact spring sheet.

At the same time, as a result of the reduced bending moments, bending tensions on the foot points 27a, 27b of the spring tongues 23a, 23b can be reduced and thus plastic and irreversible deformations avoided. This means that-the height to which the spring tongues can be bent and thereby also the spring path of the contact spring sheet 21 are increased.

To this end the two spring tongues 23a, 23b have a symmetrical arrangement and/or form around the axis in relation to an axis 24 running at right angles to the plane of the sheet 28. Preferably the spring tongues 23a, 23b are each in the form of an arc. In the embodiment in accordance with FIG. 5a the spring tongues 23a, 23b are each in the form of a circular arc, i.e. that the arc follows a section of a circle. In accordance with a further preferred embodiment shown in FIG. 5b the spring tongues 23a, 23b are each in the form of a parabola.

If the contact spring tongue 21 is pressed together between two components, the tips 25 of the spring tongues 23a, 23b glide over the surface of the component on which they are lying. To prevent them sticking there as a result of possibly their own sharp edges or on intended surface structures of the component to be contacted, the tips of the tongues 25 are bent over.

Preferably the current transfer part is enclosed by a frame, especially a frame of which the external form and/or external dimensions are identical with those of an electrolyte or membrane component of the battery. In this case the frame can be used to bring a dimensional tuning between sealing elements which seal the membrane to the same proportions. The pressure chamber can be created in a simple way by replacing an electrolytic electrode unit in a cell stack by a current transfer part enclosed by a frame such as for example a contact spring sheet 21. The frame can be made from a preferably elastic material for this purpose. If the adjoining components feature an elastic sealing material on their contact surfaces, the frame can also be hard. Preferably the frame is then made of a metal, e.g. in the form of a metal foil.

To increase the spring path the spring element can also a sheet with spring tongues bent outwards on both sides of the sheet from the plane of the sheet. Alternatively for increasing the spring path two contact spring sheets can be laid against each other.

The invention claimed is:

1. An electrochemical battery, comprising:
 a plurality of electrolytic electrode units;
 a plurality of cooling cards for cooling at least one of the electrolytic electrode units; and
 at least one pressure chamber to which pressure can be applied independently of a medium supplied to the electrolytic electrode units for creating a contact pressure between components of the electrochemical battery which are adjacent to the pressure chamber,
 wherein the pressure chamber is arranged between two of the cooling cards and is at least partly delimited by these two cooling cards.

2. The battery in accordance with claim 1, wherein the battery is a fuel cell battery or an electrolytic cell battery.

3. The battery in accordance with claim 1, wherein, within the pressure chamber, a current transfer part is arranged adjoining at least one cooling card.

4. The battery in accordance with claim 3, wherein the current transfer part is embodied as a spring element.

5. The battery in accordance with claim 4, wherein the spring element comprises at least one sheet with spring tongues bent outwards from the sheet plane.

6. The battery in accordance with claim 5, wherein the spring tongues make an acute angle with the cooling card.

7. An electrochemical battery, comprising:
 a plurality of electrolytic electrode units;
 a plurality of cooling cards for cooling at least one of the electrolytic electrode units; and
 at least one pressure chamber to which pressure can be applied independently of a medium supplied to the electrolytic electrode units for creating a contact pressure between components of the electrochemical battery which are adjacent to the pressure chamber,
 wherein the at least one pressure chamber adjoins at least one of the cooling cards and is delimited at least partly by this cooling card,
 wherein, within the pressure chamber, a current transfer part is arranged adjoining at least one cooling card,
 wherein the current transfer part is embodied as a spring element,
 wherein the spring element comprises at least one sheet with spring tongues bent outwards from the sheet plane, and
 wherein at least two of the spring tongues are arranged and/or formed such that when a force is applied to the tongue tips in a direction at right angles to the plane of the sheet the bending moments created by each of the spring tongues in the plane of the sheet at least partly mutually cancel each other out.

8. The battery in accordance with claim 7, wherein the two spring tongues exhibit a symmetrical arrangement and/or form around an axis in relation to an axis running at right angles to the plane of the sheet.

9. The battery in accordance with claim 8, wherein the two spring tongues are each in the form of an arc.

10. The battery in accordance with claim 9, wherein the arc is an arc of a circle or a parabola.

11. The battery in accordance with claim 7, wherein the tips of the tongue are rounded off.

12. The battery in accordance with claim 3, wherein the current transfer part is enclosed by a frame.

13. The battery in accordance with claim 12, wherein the frame is made of a seal material.

14. The battery in accordance with claim 13, wherein the seal material is an elastic seal material.

15. The battery in accordance with claim 12, wherein the frame is made of metal.

16. The battery in accordance with claim 12, wherein the external form and/or the external dimensions of the frame are identical to those of an electrolyte of the electrolytic electrode units.

17. The battery in accordance with claim 1, wherein the at least one cooling card comprises a contact plate on its side facing the pressure chamber.

18. The battery in accordance with claim 17, wherein the contact plate comprises a conductive layer applied to a base layer, and wherein the specific electrical conductivity of the conductive layer exceeds the specific electrical conductivity of the base layer.

19. The battery in accordance with claim 18, wherein the conductive layer is thinner than the base layer.

20. The battery in accordance with claim 17, wherein the electrical conductivity of the contact plate exceeds the electrical conductivity of the cooling card.

21. The battery in accordance with claim 18, wherein the conductive layer is arranged on the side of the contact plate facing the pressure chamber.

22. The battery in accordance with claim 21, wherein a further conductive layer is arranged on the side of the contact plate facing away from the pressure chamber.

23. The battery in accordance with claim 18, wherein the conductive layer is applied to the base layer as an electrical coating or through sputtering, gluing, pressure welding or friction welding.

24. The battery in accordance with claim 18, wherein the conductive layer is applied as a foil to the base layer.

25. The battery in accordance with claim 1, wherein the number of electrolytic electrode units is at least twice as large as the number of pressure chambers.

* * * * *